(12) United States Patent
Woolfe et al.

(10) Patent No.: US 6,894,806 B1
(45) Date of Patent: May 17, 2005

(54) COLOR TRANSFORM METHOD FOR THE MAPPING OF COLORS IN IMAGES

(75) Inventors: Geoffrey J. Woolfe, Penfield, NY (US); Robert E. Cookingham, Webster, NY (US); John R. D'Errico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/540,807

(22) Filed: Mar. 31, 2000

(51) Int. Cl.$^7$ .................................................. H04N 1/60
(52) U.S. Cl. ........................ 358/1.9; 358/518; 382/167
(58) Field of Search ....................... 358/1.9, 518, 501, 358/520, 525, 500; 382/167, 162

(56) References Cited

U.S. PATENT DOCUMENTS

| | | | |
|---|---|---|---|
| 4,631,578 A | 12/1986 | Sasaki et al. ................. 358/80 |
| 5,202,935 A | 4/1993 | Kanamori et al. ............ 382/54 |
| 5,539,540 A | * 7/1996 | Spaulding et al. .......... 358/518 |
| 5,583,666 A | * 12/1996 | Ellson et al. ............... 358/518 |
| 5,751,845 A | 5/1998 | Dorff et al. ................. 382/162 |
| 6,266,165 B1 | * 7/2001 | Huang et al. ............... 358/520 |
| 6,594,388 B1 | * 7/2003 | Gindele et al. ............. 382/167 |
| 2003/0112454 A1 | * 6/2003 | Woolfe et al. ............... 358/1.9 |

FOREIGN PATENT DOCUMENTS

| | | | | |
|---|---|---|---|---|
| EP | 0 441 558 A1 | 2/1991 | ........... G06F/15/72 |
| EP | 0 709 806 A2 | 5/1996 | ............. G06T/5/40 |
| EP | 0 720 352 A1 | 7/1996 | ............ H04N/1/62 |
| EP | 0 741 492 A1 | 11/1996 | ............ H04N/1/62 |
| EP | 0 946 050 A2 | 9/1999 | ............ H04N/1/60 |
| WO | WO9629829 | * 9/1996 | ............ H04N/9/75 |

\* cited by examiner

Primary Examiner—Scott A. Rogers
(74) Attorney, Agent, or Firm—David M. Woods

(57) ABSTRACT

A file of digital color data representing a color image is transformed into a new file of digital color data where one or more colors have been transformed to one or more new color locations where their reproduction is known to be preferred. The digital color data is provided in a multi-dimensional color space where the color locations to be operated on in the color space are designated as color magnets. The color space distance is then calculated between the color locations of the digital color data in the color space and the color magnets. A particular activity is prescribed for each color magnet that affects nearby color locations in the color space; this activity includes one or more activity selected from the group including attraction, repulsion, shielding and dragging. Then, the digital color data is mapped to new locations in the multi-dimensional color space as a function of the color space distance and the selected activity, wherein the degree or strength of activity is a function of the color space distance or direction in color space.

34 Claims, 13 Drawing Sheets

COLOR TRANSFORM METHOD FOR THE MAPPING OF COLORS IN IMAGES

FIELD OF THE INVENTION

This invention relates to the field of digital image processing, and in particular to the field of color image transformation.

BACKGROUND OF THE INVENTION

In designing color image capture and reproduction systems, it is important to be able to render colors in an optimal manner such that they are most meaningful, appropriate, natural, and pleasing. Various modes of color reproduction are applicable in different color reproduction applications. For instance, a color image in a fine art publication may well be judged in terms of the accuracy of color appearance of the reproduction relative to the original artwork. Images intended for advertising may be judged in terms of the colorimetric accuracy of the reproduction of certain trademark colors against an aim. Color reproductions of analytical test charts such as the Macbeth™ color checker are judged relative to the spectral accuracy of the reproduction patches compared to the objects those patches represent. Pictorial images are generally judged against more arbitrary standards. Images used in commercial applications often have their chromas boosted, making them more appealing and attention grabbing. Professional portrait photographers will always print skin tones that flatter the subject rather than provide the most accurate rendition. Personal photographs, or snapshots, are frequently judged relative to a memory of how the original scene appeared. These memories are seldom "calorimetrically accurate" and are frequently influenced by color preferences of the customer, particularly for the so-called memory colors including sky, foliage and skin tones.

A comprehensive discussion of color rendition can be found in R. W. G. Hunt, *The Reproduction of Colour, 5$^{th}$ Edition*, Fountain Press, pp. 223–242 (1995). Hunt describes how color images can be reproduced in a range of different ways, to achieve a number of different objectives. In each case, however, observers judge the color quality of that reproduction according to their intended use of the image. Hunt has identified six distinct modes of color reproduction that cover all applications of color reproduction from entertainment to scientific.

The most demanding mode of color reproduction is "spectral reproduction". This is where the spectral reflectance (or transmittance) of the reproduction matches that of the original. In this case the reproduction and the original will match in appearance regardless of changes in illuminant for any observer. Spectral color reproduction is seldom achieved in practice and is not commercially viable as a means of image reproduction.

In "calorimetric color reproduction" the chromaticities and relative luminances of the original and reproduction match for a defined viewing illuminant and a defined standard observer. Since color appearance is not independent of viewing illuminant intensity, calorimetric reproductions do not match originals in color appearance for large intensity changes.

"Exact color reproduction" occurs when the conditions for colorimetric color if reproduction are met and, the absolute luminances of the reproduction and original match. The original and reproduction will match in appearance for a standard observer under identical conditions of visual system adaptation.

If a reproduction is to be viewed under different conditions of adaptation than the original then a color appearance match can only be achieved if adaptation factors are considered and accounted for in the mode of reproduction. This is the case with "equivalent color reproduction". This is very difficult to achieve in practice because the colorfulness of objects seen under bright daylight usually cannot be reproduced under artificial illuminant viewing conditions.

In "corresponding color reproduction" the objective is to reproduce an original scene as it would appear if it were viewed under the reproduction viewing conditions.

The final mode of color reproduction is "preferred color reproduction". In this mode the reproduction colors are rendered to match the preference of the observer. These preferences will tend to vary from observer to observer but there are general, quantifiable preferences that exist across most observers that can be included in a color reproduction.

In addition to the Hunt book, there are a number of publications in the technical literature that refer to the importance of preferred colors and concept of key memory colors in the art of rendering natural images. For example, C. J. Bartleson, "Memory Colors of Familiar Objects," Journal of the Optical Society of America, 50, pp. 73–77, (1960); P. Siple, and R. M. Springer, "Memory and Preference for the Colors of Objects," Perception and Psychophysics, 34, pp. 363–370, (1983); S. Sanders, "Color Preferences for Natural Objects," Illumninating Engineering, 54, p. 452, (1959); and R. W. G. Hunt, I. T. Pitt, and L. M. Winter, "The Preferred Reproduction of Blue Sky, Green Grass and Caucasian Skin in Colour Photography," Journal of Photographic Science," 22, pp. 144–150, (1974). It is evident from this literature that, for some objects whose colors are well-known, preferred color reproduction may be advantageous, wherein departures from equality of appearance (whether at equal or at different absolute luminance levels) may be required in order to achieve a more pleasing rendition.

As a consequence, imaging and photographic companies have intuitively understood the benefits of preferred color rendition for many years and have attempted to achieve some measure of customer preference through careful manipulation of the characteristics, including tone scale, interimage and spectral sensitivity, of the photographic system. In contemporary imaging systems, preferred color rendering is often accomplished through the use of some form of preferred color mapping. For example, U.S. Pat. No. 5,583,666 describes a method for transforming an input color space to an output color space using a transform. In particular, a computer graphics morphing technique is described wherein the explicit constraints are comprised of points residing on the gamut boundary of the input and output color spaces. Although this method produces a smooth output rendition, it is limited in terms of the constraints it can impose on the color space transformation. An arbitrary point in the color space cannot be moved to another arbitrary position in color space. A group of patents issued to Buhr et al. (U.S. Pat. Nos. 5,528,330; 5,447,811; 5,390,036; and 5,300,381) describe color image reproduction of scenes with preferential tone mapping for optimal tone reproduction in color photographs. In this series of patents, the image reproduction is modified by a scene parameter transformation which, when taken in conjunction with untransformed characteristics of the image reproduction system and method, results in a reproduced tone mapping having instantaneous gamma values with a prescribed set of properties. This produces a reproduction having preferred visual characteristics with respect to tones, but does not address the issues of preferred color nor does it provide any method of generating a preferred color reproduction. Such tonal mappings, when applied to color data represented in an additive RGB type of color space, also result in chroma modifications. These chroma modifications are coupled to the tonal mapping and achieve chroma increases only as a consequence of luminance contrast increases. There is no provision in such methods for independent control of luminance and chrominance mappings. Furthermore tonal mappings such as these introduce uncontrolled hue shifts for most colors whenever the tonal mapping deviates from linearity Another limitation of tonal mappings is that there is no ability to selectively apply the transform to limited regions of the color space.

As mentioned above, in contemporary imaging systems, preferred color rendering is often accomplished through the use of some form of preferred color mapping that is typically achieved through limited, slow and inflexible means. These means include, but are not limited to, modification of tonescales, modifications of selected colors, change of dyes or colorants, or manual manipulation of digital images using products such as Adobe Photoshop®. Because the perception of the light received by the eye and interpreted as a natural image is a very complex process, the subtle color and tonescale changes inherent in natural images are not well accommodated by simple transformations. As a result, a myriad of artifacts and unnatural appearing problems occur. These problems can include transitions between colors across gradients of hue, chroma, or lightness that are not as smooth or continuous as they appear in the natural scene. These transitions may produce artifacts or discontinuities in the image. In additions the calculations necessary to compute the required transforms are often complex and may require dedicated computational resources and time. The time required for accomplishing the calculations often limits the applicability of the methods because they cannot be done in real time as images are physically produced and as a result must be done off line or else a substantial sacrifice in productivity will result.

What is needed is a completely new algorithm that enables colors to be transformed to produce a preferred color mapping, preferably by moving colors to or toward preferred positions in a color space. Ideally, when natural images are processed, gradations in color or between colors should appear as smooth or sharp in the modified images as they did in the original. Specifically, continuous transitions should be smooth and continuous and should not produce artifacts, discontinuities or contours. In addition, the overall impression of the composition of the image should be such that the rendered image is more pleasing than prior to treatment with the algorithm.

SUMMARY OF THE INVENTION

The present invention is directed to overcoming one or more of the problems set forth above. Briefly summarized, according to one aspect of the present invention, the invention resides in a method for transforming a file of digital color data representing a color image into a new file of digital color data where one or more colors have been transformed to one or more new color locations where their reproduction is known to be preferred. The digital color data is provided in a multi-dimensional color space where the preferred color locations in the color space are designated as color magnets. The color space distance is then calculated between the color locations of the digital color data in the color space and the color magnets, wherein each color magnet has a predetermined region of influence. A particular activity is prescribed for each color magnet that affects color locations in the color space within the region of influence of each color magnet. Then, the digital color data is mapped to new locations in the multi-dimensional color space as a function of the color space distance and the selected activity, wherein the degree or strength of activity is a function of the color space distance or direction in color space. More specifically, the aforementioned activities includes such activities as attraction, repulsion, shielding and dragging.

The advantageous features of this invention are realized when natural images are processed practicing this invention. Gradations in color or between colors appear as smooth or sharp in the rendered images as they did in the original image. Continuous transitions are smooth and continuous and do not produce artifacts, discontinuities or contours. In addition, the overall impression of the composition of the image is such that the rendered image is more pleasing than prior to treatment with the algorithm. In related technical advantages, the time required to process an image is minimized because the transformation may be generated in a separate, off-line process and used to calculate a three dimensional lookup table that is subsequently used to apply the transformation to images. This can be done because transformations can be constructed that are universally applicable to all natural images, not just a small subclass of images. Thus in operational use, the required calculations are extremely rapid because they only require the application of a single three-dimensional look up table to the pixels in the image. The transformation can be applied to images in a high volume digital photofinishing application in real time.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
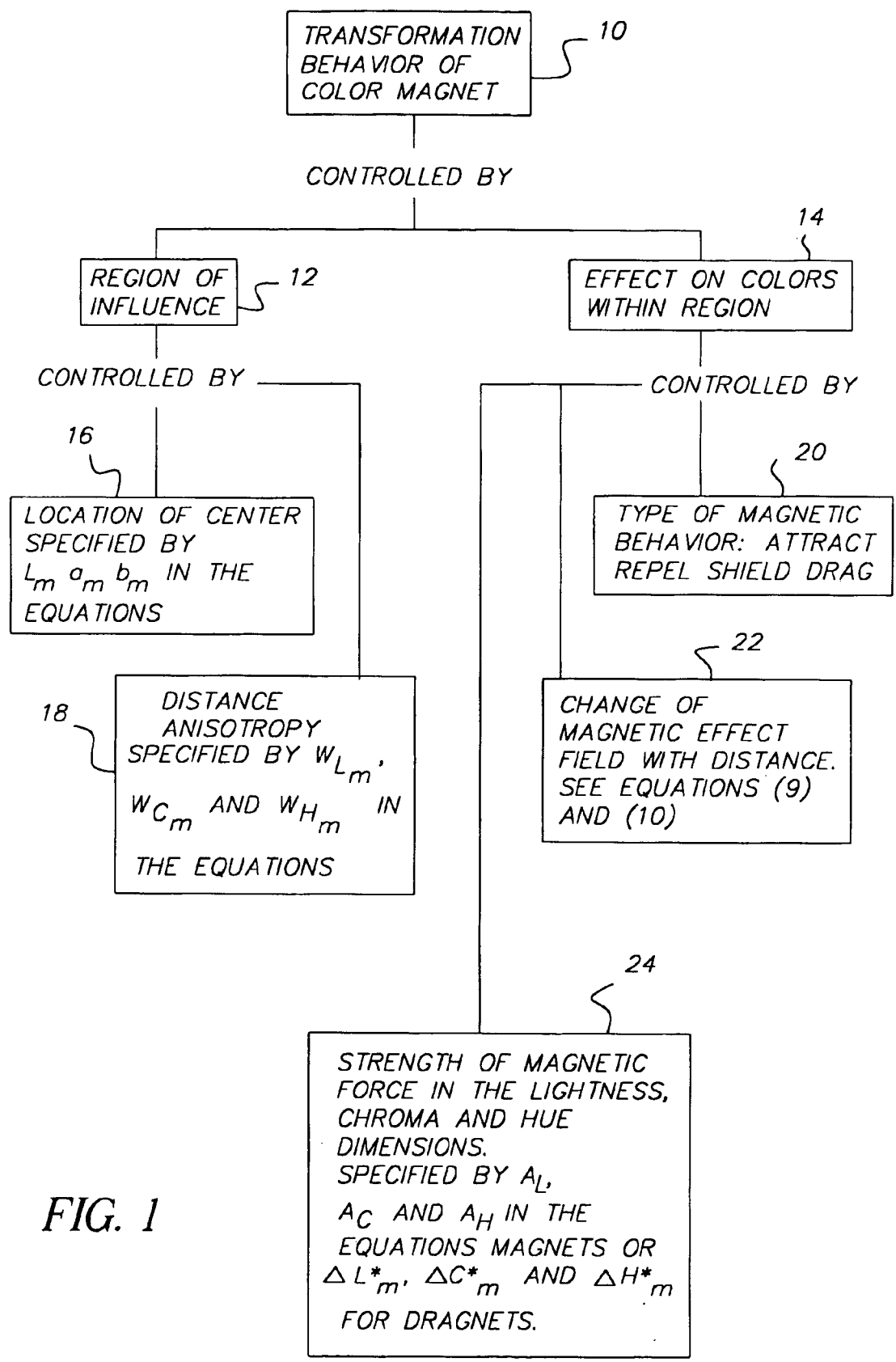
FIG. 1 is a schematic illustration of the elements controlling the behavior of a color magnet.

Because digital image processing algorithms and systems employing color space transformations are well known, the present description will be directed in particular to attributes forming part of, or cooperating more directly with, a color space transformation in accordance with the present invention. Attributes not specifically shown or described herein may be selected from those known in the art. In the following description, a preferred embodiment of the present invention would ordinarily be implemented as software in a computer program. Those skilled in the art will readily recognize that the equivalent of such software may also be constructed in hardware. Given the method as described according to the invention in the following materials, software not specifically shown or suggested herein that would be useful for implementation of the invention is conventional and within the ordinary skill in such arts. Moreover, the computer program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

This invention relates to a new method that enables colors in an image to be transformed to produce a new color mapping for producing images. It is generally used in the field of digital image processing to modify the colors in a rendered image, or in a digital image in an intermediate stage of processing, in a way that those viewing the images perceive the color to be more preferred. This is accomplished through an algorithm that transforms the color space by attracting, or otherwise moving, colors to or toward preferred positions in a color space in a smooth and naturally appearing manner. The transformation is such that the mapping of colors is accomplished in a smooth and continuous fashion that does not produce artifacts, contours or discontinuities in the image and maintains the appearance of the image as a natural image. Additionally, in certain specific applications, it is possible to dramatically, and intentionally, alter the appearance of an image using color magnets such that the altered image no longer looks like a natural image.

The attraction of colors to or toward preferred positions in a color space in a smooth and naturally appearing manner is obtained by an algorithm that utilizes features herein characterized as "color magnets". The color magnets transformations described herein are contained in an algorithm that provides a smooth, artifact free means of implementing preferred color transforms in a color reproduction system. "Color magnets", as used in this disclosure, refers to an algorithm designed to produce color transforms through a mathematical transform as described herein. The term "color magnets" is used herein in the sense of an approximate analogy between the physical effects of attraction and repulsion that physical magnets have on magnetic materials and the effect that the transformation achieved by this invention has on values in a color space to or toward or away from a given point in that color space. It is anticipated that these transforms will typically be used to produce a preferred color mapping for an image or group of images.

In practice, this invention is embodied in an algorithm that allows the user to create a transform that modifies the colors in an image. While it would be feasible to process the digital information representing the colors in an image through the algorithm a pixel at a time, this could be a slow process. Consequently, the preferred embodiment comprises using the algorithm to produce a multi-dimensional (typically three-dimensional) lookup table of numbers for effecting the transformation. The digital information representing the colors in an image are then processed through the lookup table to produce a new set of digital information representing the desired colors. The algorithm typically works in the CIELab/CIELCh color space but can also be used in any other color space, such as CIELUV color space. The advantage of CIELab/CIELCh is that it is an approximately perceptually uniform space, making the results of the transform easier to predict. In fact, any multi-dimensional color space may be used wherein the dimensions correspond to perceptual attributes of color for human observers, including one or more of lightness, brightness, chroma, colorfulness, saturation and hue. A detailed description of these color spaces can be found in *Color Appearance Models* by Mark D. Fairchild, Addison-Wesley, (1997).

As expressed in FIG. 1, the behavior 10 of a color magnet, and the color transformation it produces, is controlled by two factors: The region of influence 12 of the magnet, that is, the region of color space that the magnet influences and, secondly, the effect 14 that the magnet has on colors within its region of influence. While the functional behavior of a color magnet may be defined such that the region of influence has a definite boundary, it should be understood that the region of influence of the magnets is preferably unbounded in extent given the functional behavior defined below. In this case, consequently, a region of influence is defined as the region in which the "magnetic effect" is greater than a given threshold that would typically cause a visually perceptual change in a color. The region of influence of the magnet is in turn controlled by two factors: The location of the center 16 of the magnet and the way that the color space distance calculation 18 is defined for the magnet. The effect that the magnet has on colors within its region of influence is in turn controlled by three factors: The type of magnetic behavior 20 ascribed to the magnet (i.e. attract, repel, shield or drag), a function 22 that describes how magnetic effect changes with color space distance (as it is defined for that particular magnet) and the strength factors 24 that allow additional control over the direction of color change within the color space.

Figure 2:
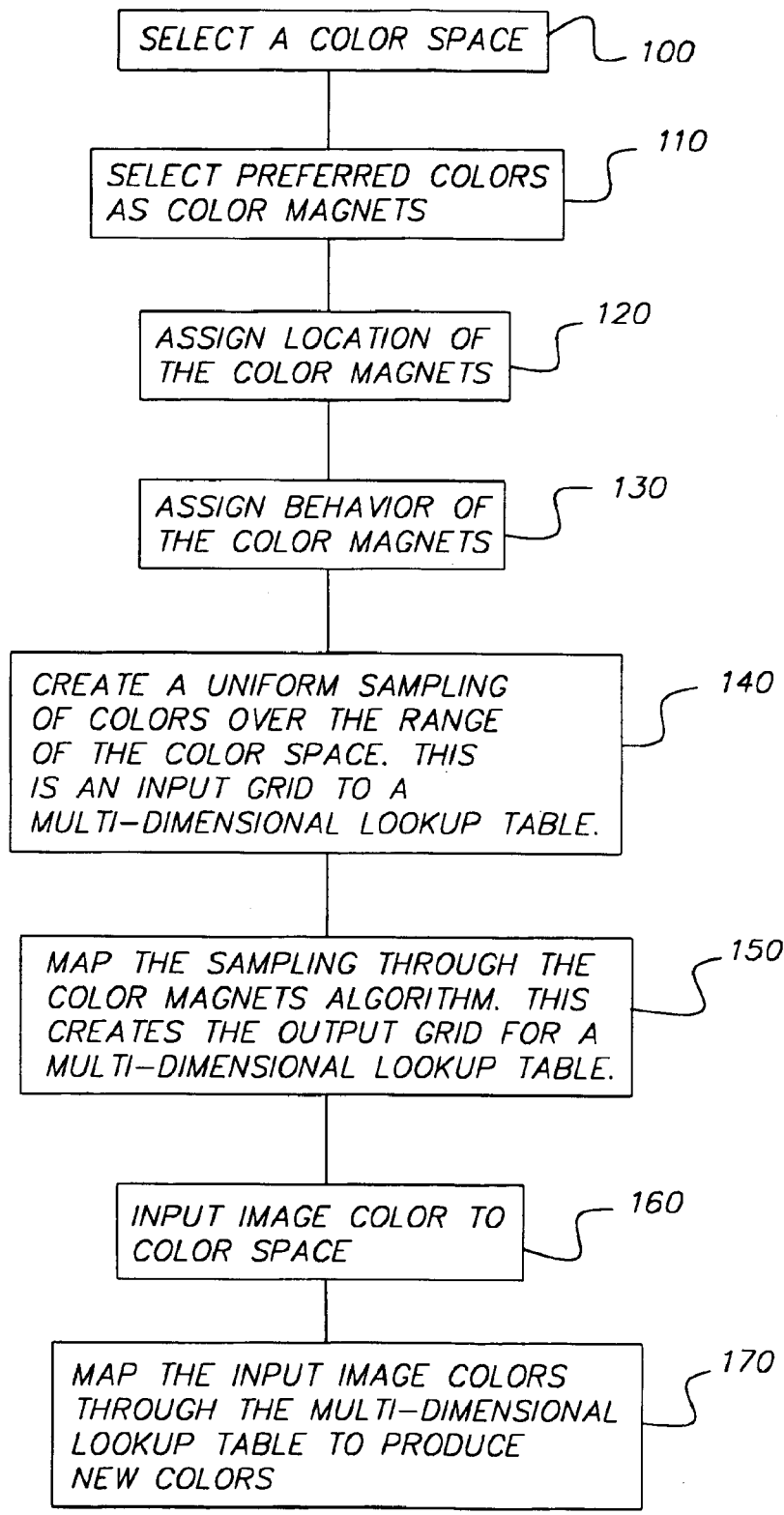
FIG. 2 is a diagram of the process for transforming digital color data in accordance with the invention.

The overall method for transforming image color using a color magnets transform, in the form of a multi-dimensional lookup table, in accordance with the invention is shown in FIG. 2. Initially, in step 100 a color space is chosen; as mentioned above, the preferred color space is CIELab/CIELCh color space. Then in a step 110, certain colors are specified that represent the centers of regions of color space that are to be modified. If an attractive magnet is to be specified then this center represents a preferred color position. It may, for example, represent a significant memory color such as skin color, blue sky or green foliage. (An attractive magnet may be used to modify other colors that would not ordinarily be considered significant memory colors; for example, a color magnet may be specified to lower the lightness of saturated reds to bring them inside the gamut of photographic paper.) In the case of a repulsive magnet then the center would represent an undesirable color, or a color around which color differentiation is to be increased. If a shield is to be specified then the color center represents the central color of a region that is to be protected from change. An example of this might be an average Caucasian flesh color. In the case of a dragnet the color center represents the center of a region of color space that we wish to modify. The color magnets are then assigned coordinate locations in step 120 that match the location of these preferred colors. Since the color magnets exhibit different field characteristics (i.e., attract, repel, shield or drag) that act upon nearby colors, the desired behavior of the color magnets is specified in step 130. Attractive and repulsive type color magnets generate a field-like effect that encompasses and acts upon adjacent colors in the color space. Shield type color magnets exert a protective field on adjacent colors with the extent of protection falling off as distance from the magnet center increases. Dragnets can be pictured as centers to which adjacent colors are linked by anisotropic elastic bonds. The closer a color is to the center of the dragnet, the more strongly it is bound to the dragnet. Colors are also considered to be bound to their current locations by similar elastic bonds. The dragnet center is then moved to a new location in the color space, pulling adjacent colors along with it. Colors closest to the dragnet center, being more strongly bound to it, are dragged closer to the new location than colors that were further from the dragnet center. A regular sampling of colors within the chosen color space is generated in step 140. This is generally achieved by sampling values (uniformly or otherwise) along each of the independent dimensions of the color space and constructing all combinations (a full factorial) of these sampled values to create a grid of fully specified colors within the color space. The grid of colors is mapped through the color magnets algorithm in step 150, resulting in a set of transformed colors within the color space. This set of colors, together with the input set of colors can be used to fully define and construct a multi-dimensional lookup table. In order to apply the color magnets transform to an image it is only necessary to convert the image to the color space chosen in step 100 and to map the image through the multi-dimensional lookup table previously constructed (step 170).

Figure 3A:
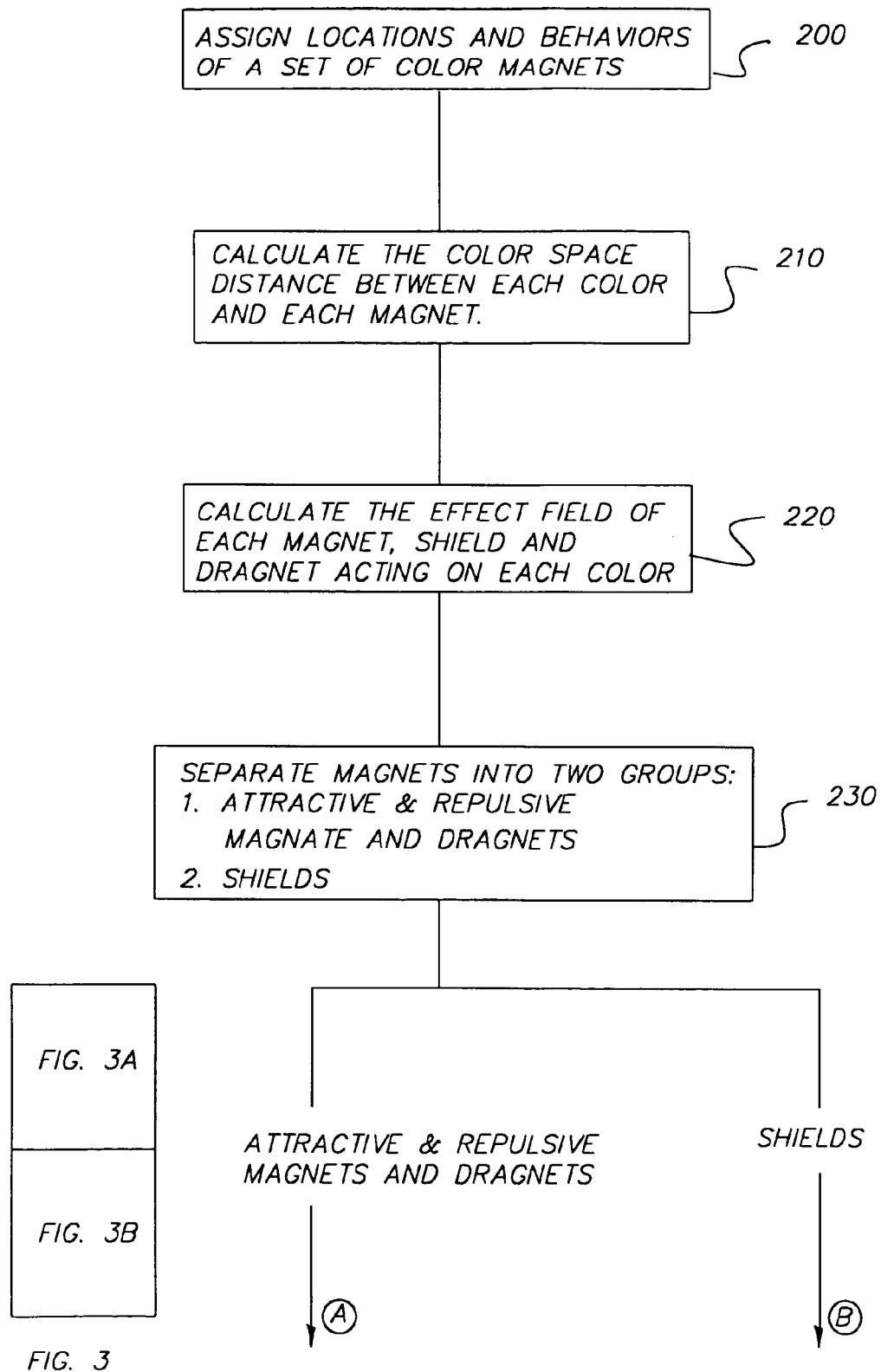
FIGS. 3A and 3B together form a diagram of the process for calculating the color magnets algorithm.
Figure 3B:
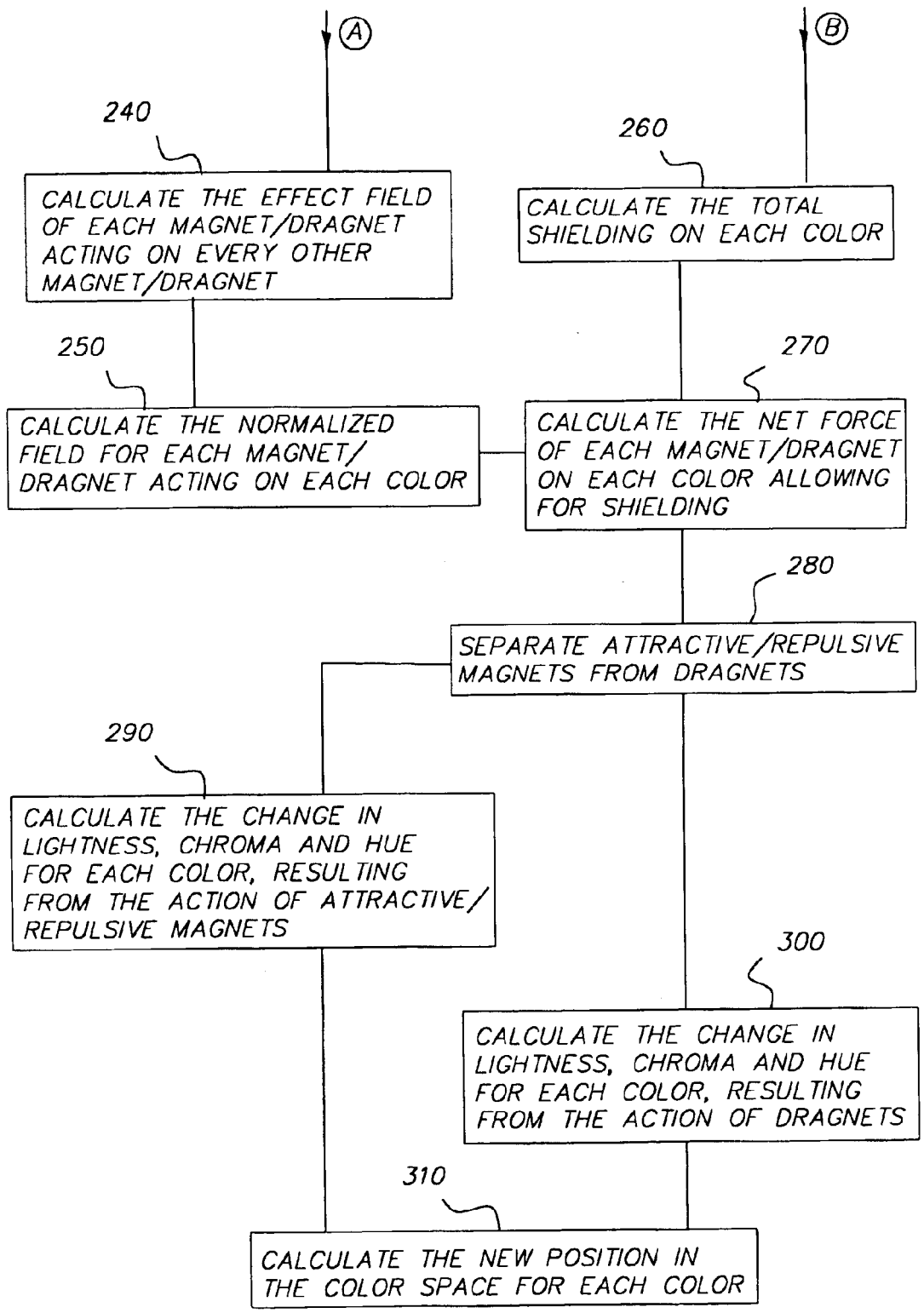
Figure 4A:
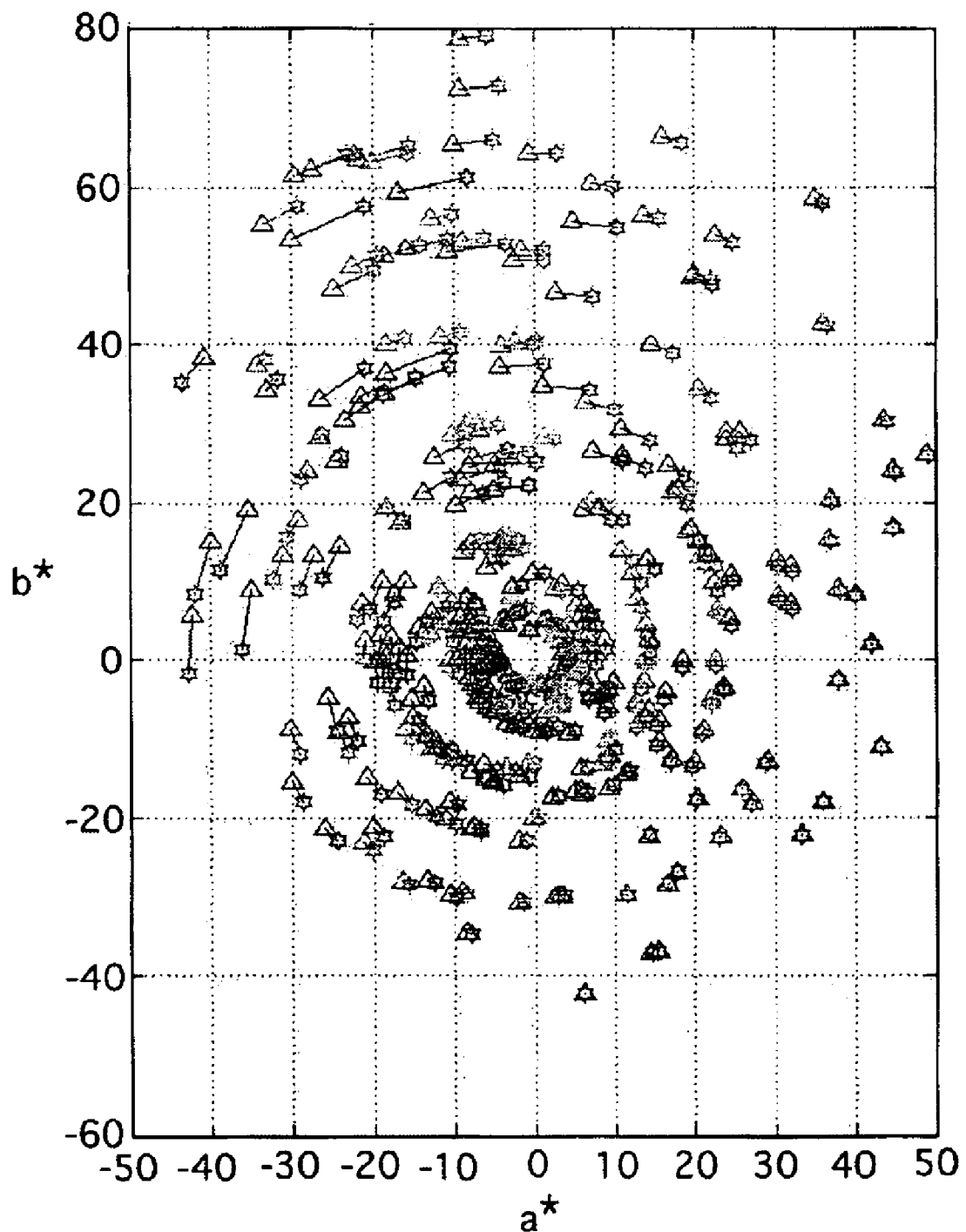
FIGS. 4A and B show examples of the effect of an attractive magnet that affects the hue and lightness, as shown on CIELab b* versus a* and L* versus C* diagrams, respectively. The colors are indicated by stars before application of the color magnets algorithm and by triangles after application of the color magnets algorithm.
Figure 4B:
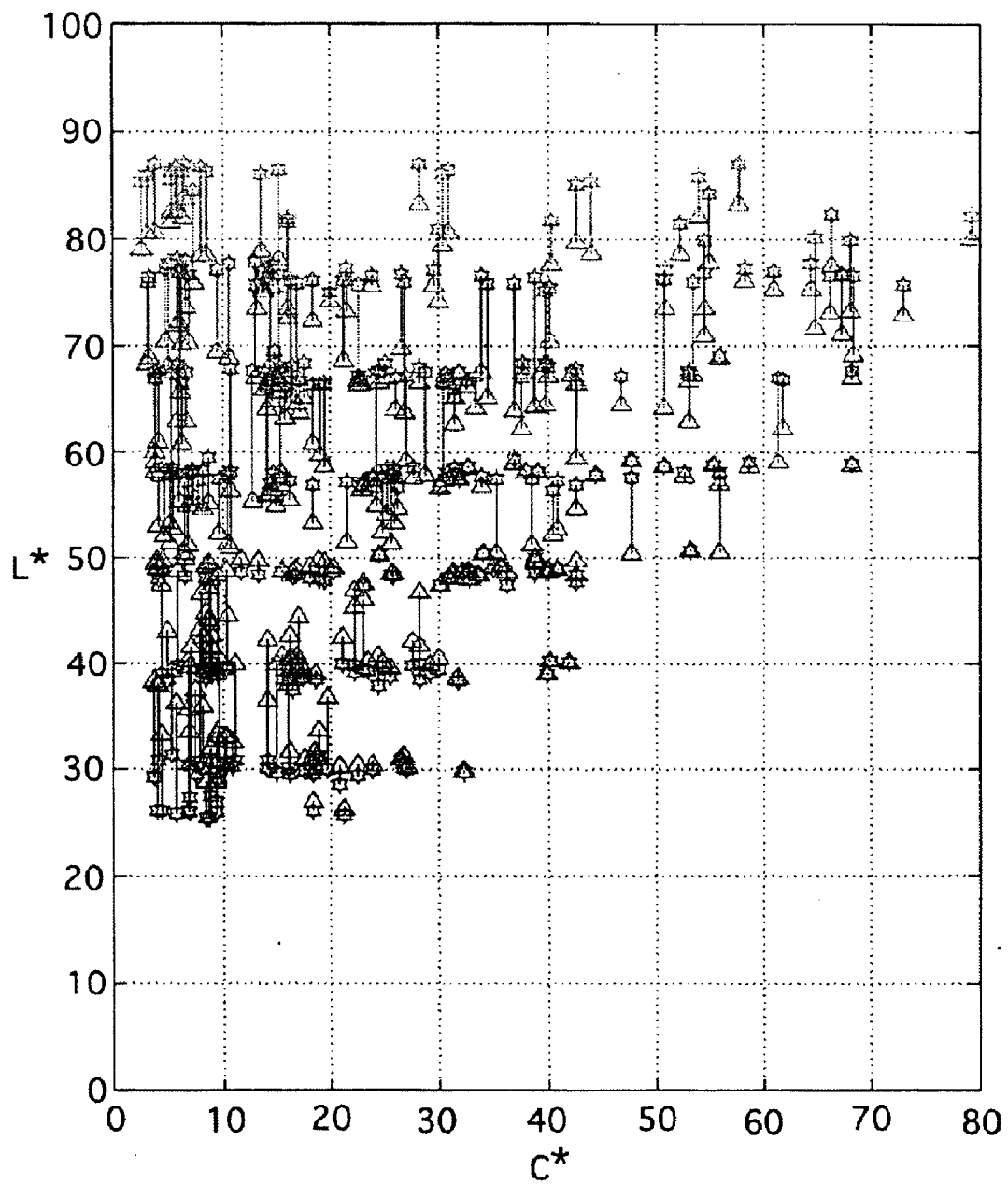
Figure 5A:
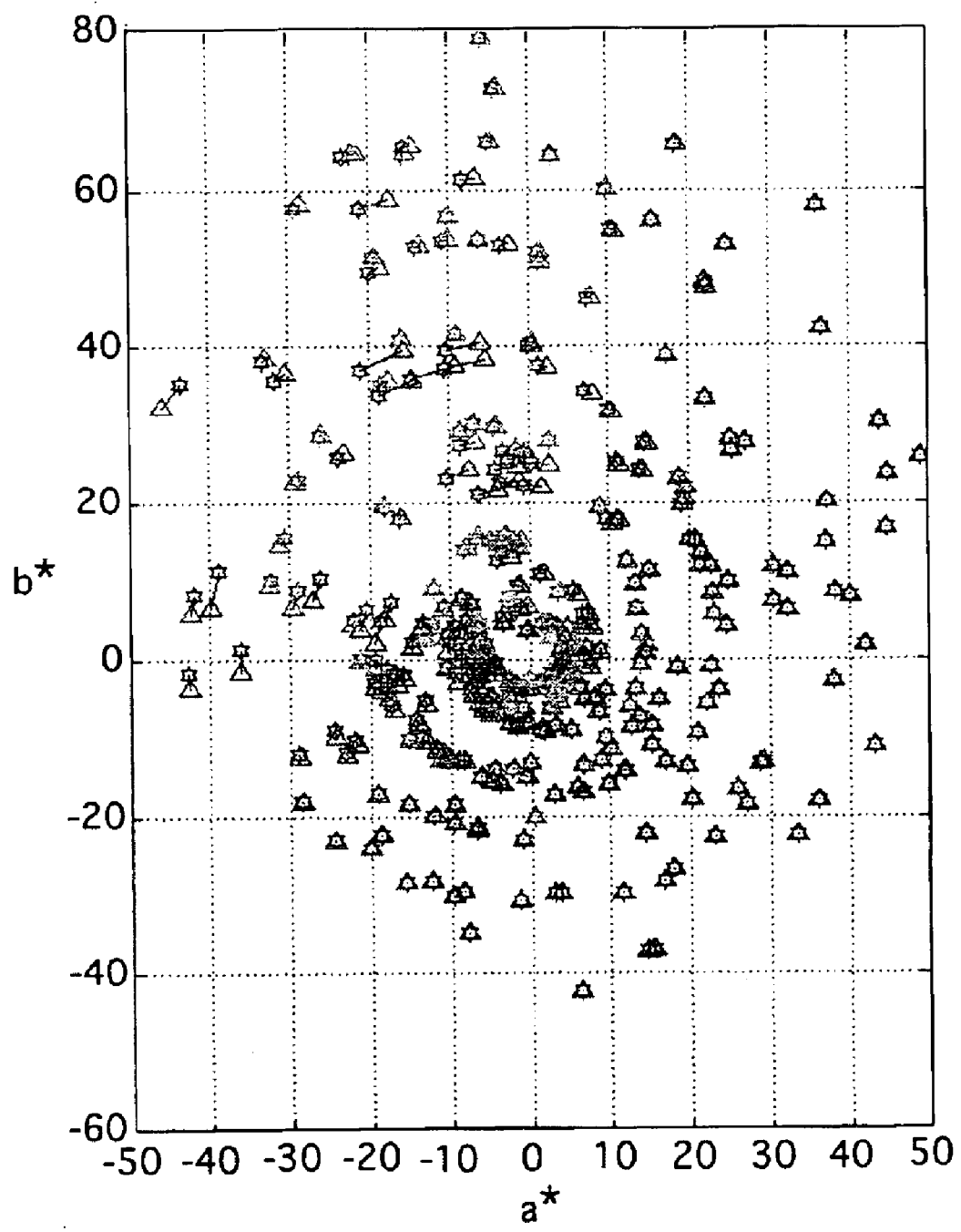
FIGS. 5A and B show examples of the effect of a repulsive magnet that affects the hue and lightness of green colors having mid-levels of lightness, as shown on CIELab b* versus a* and L* versus C* diagrams, respectively. The colors are indicated by stars before application of the color magnets algorithm and by triangles after application of the color magnets algorithm.
Figure 5B:
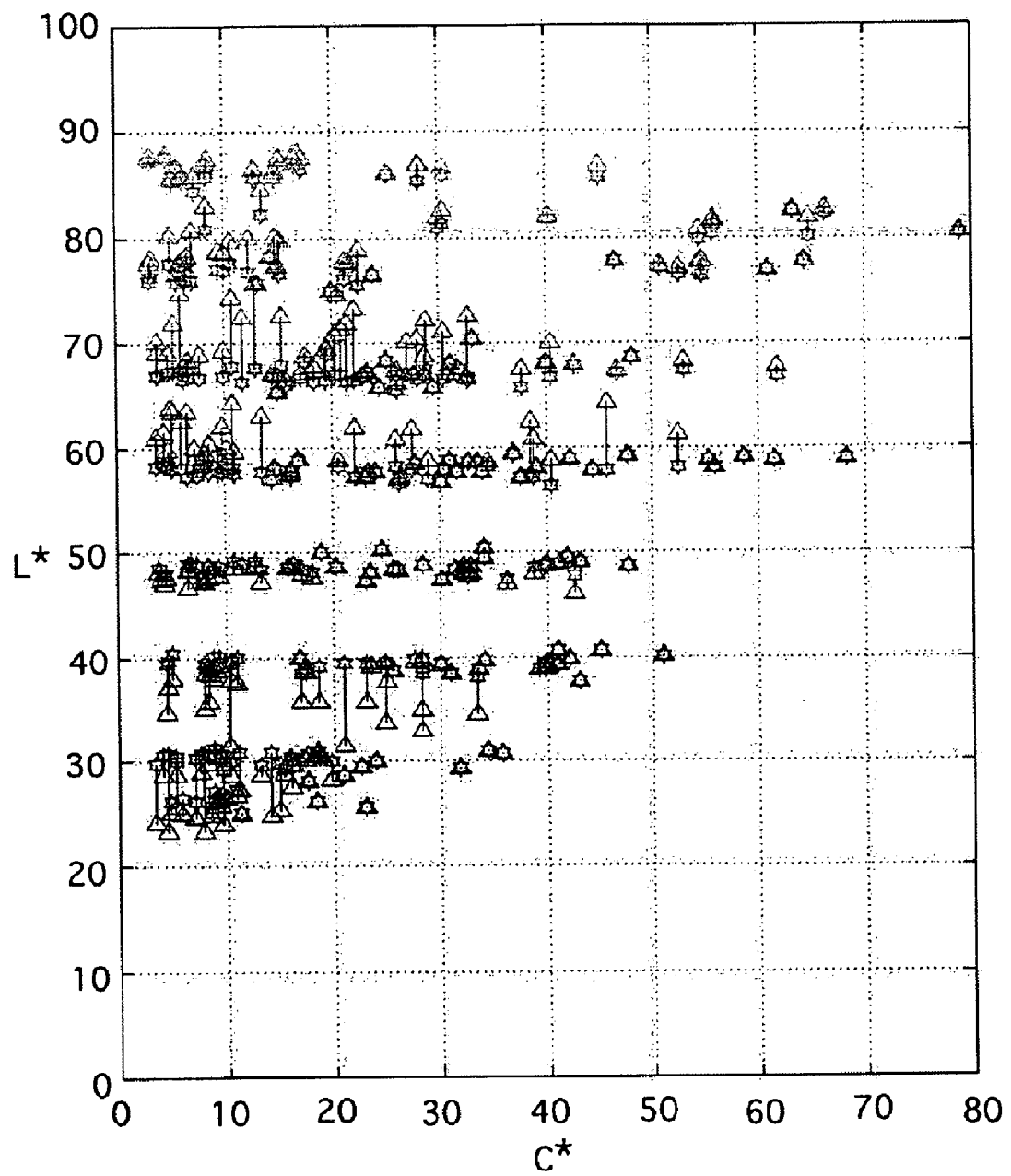
Figure 6A:
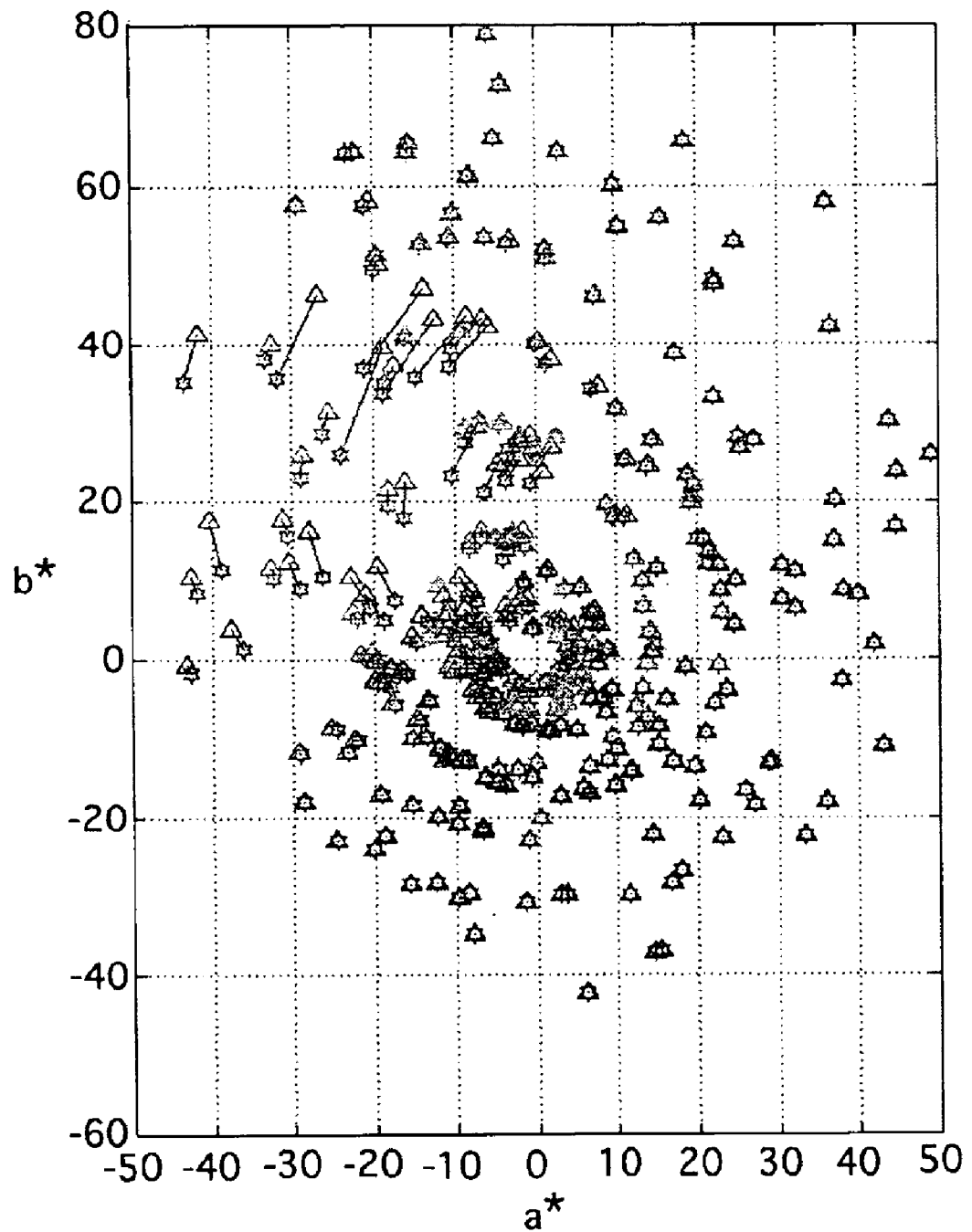
FIGS. 6A and 6B show examples of the effect of a dragnet that changes green colors by increasing chroma and lightness by 10 and decreasing hue by 20, as shown on CIELab b* versus a* and L* versus C* diagrams, respectively. The colors are indicated by stars before application of the color magnets algorithm and by triangles after application of the color magnets algorithm.
Figure 6B:
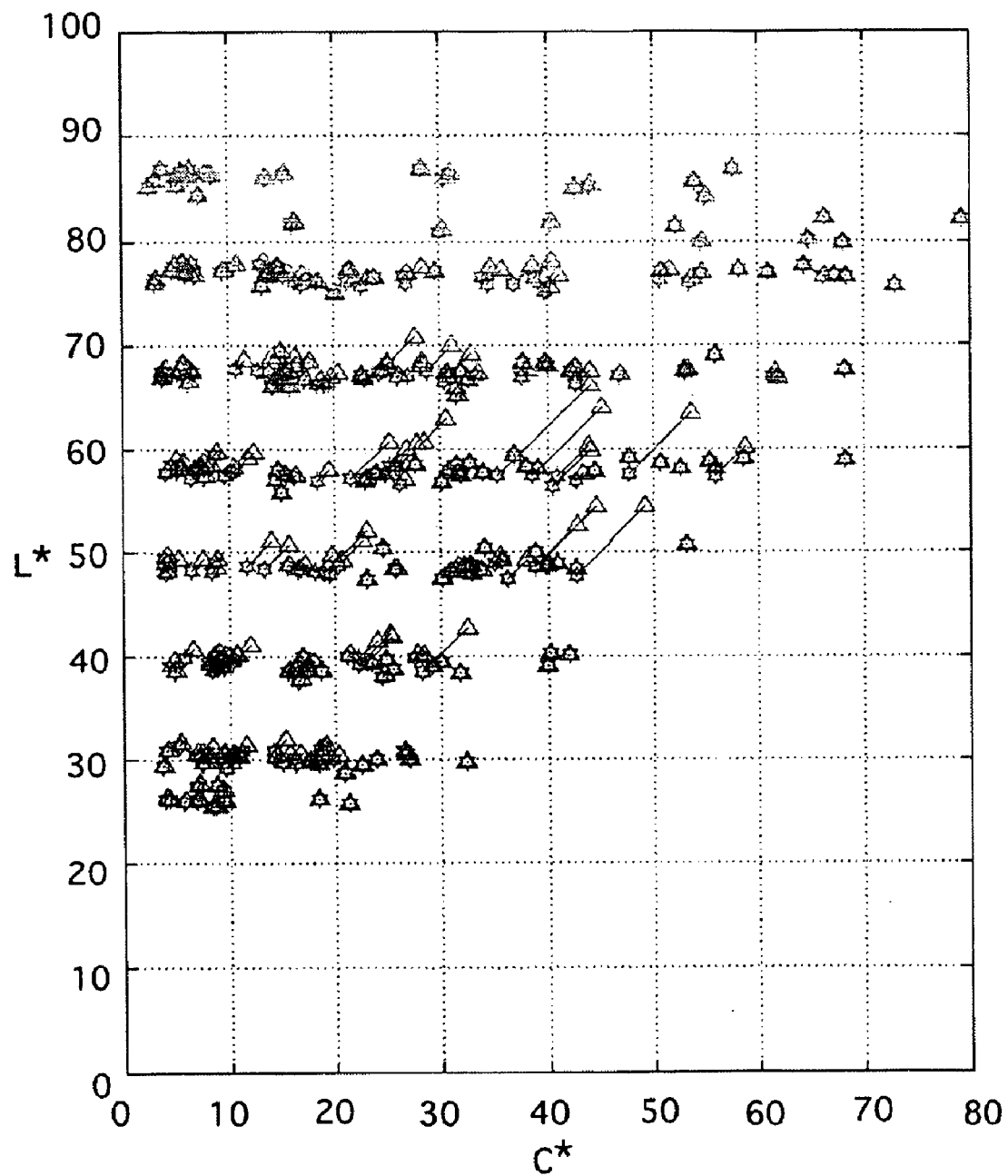
Figure 7A:
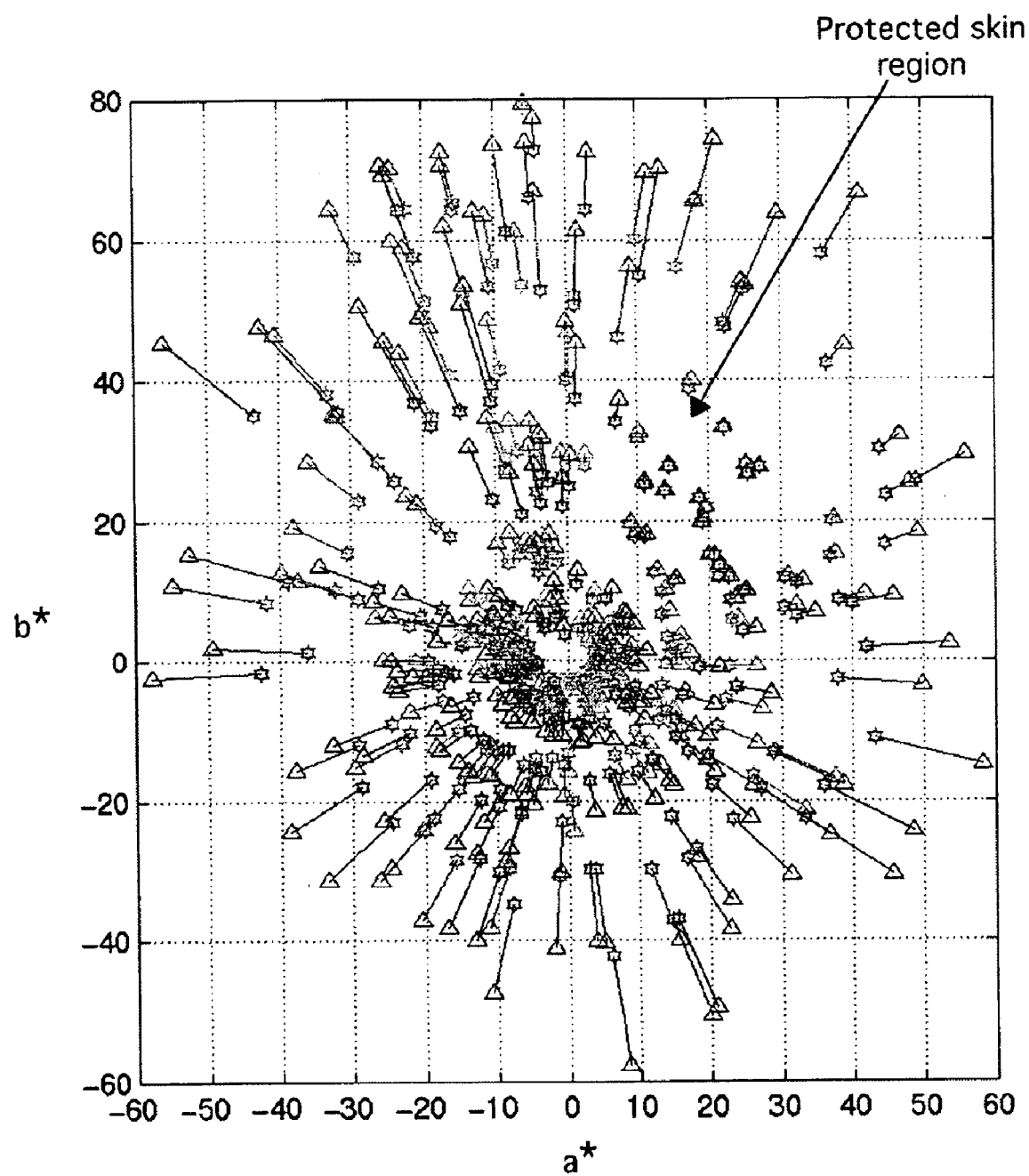
FIGS. 7A and B show examples of the effect of a shield that protects skin colors (L*≈50, a*≈25, b*≈25) acting on a magnet that modifies chroma and lightness of all hues, as shown on CIELab b* versus a* and L* versus C* diagrams, respectively. The colors are indicated by stars before application of the color magnets algorithm and by triangles after application of the color magnets algorithm.
Figure 7B:
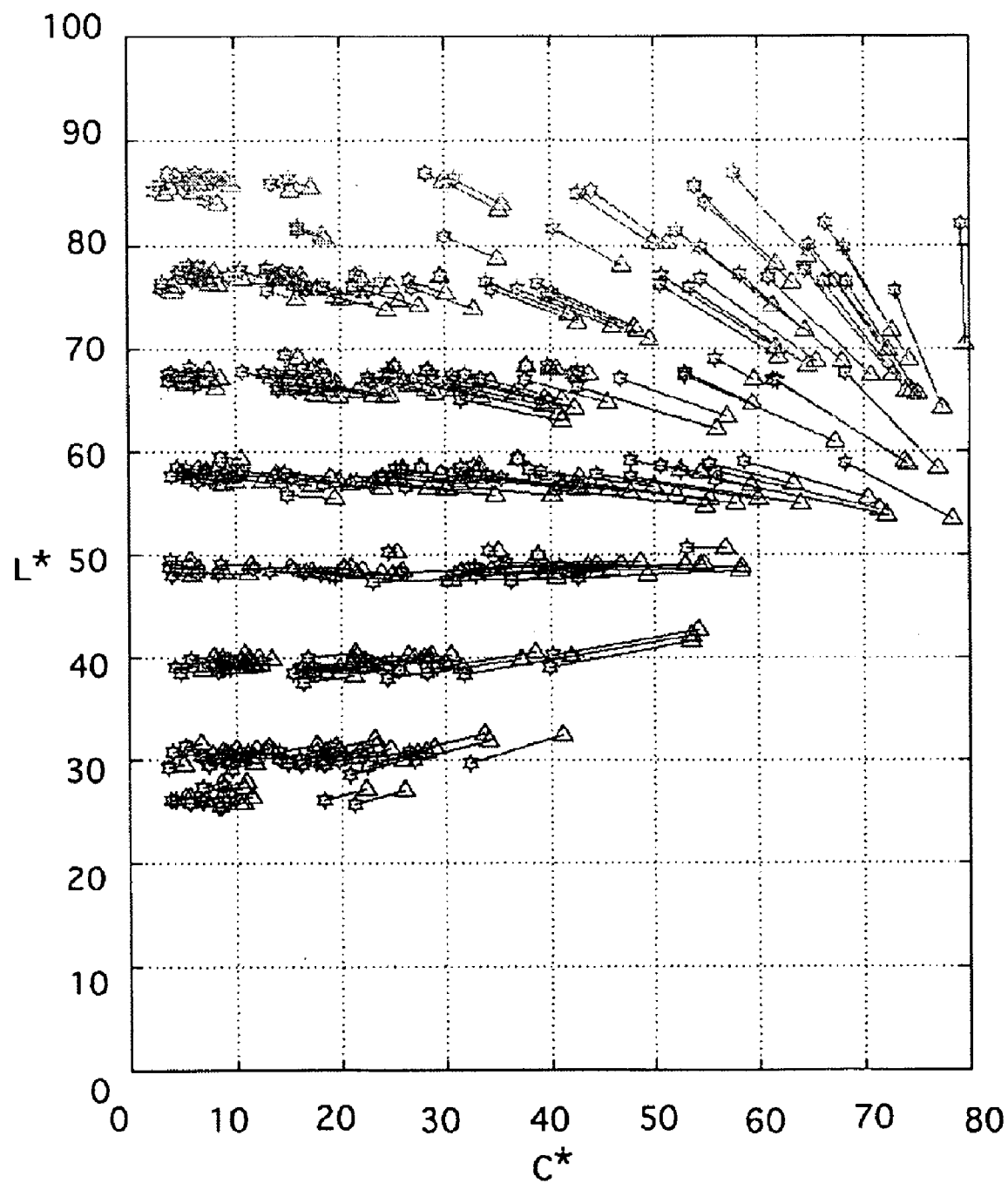

The procedure for using the color magnets algorithm is shown in FIGS. 3A and 3B. In step 200 the locations and behaviors of the color magnets are defined. The behavior of color magnets has been discussed above. Turning now to the location of the center of each magnet, color magnets are assigned a center point location in the working color space. In the CIELab/CIELCh color space for example, the location of the color magnet center is described by a set of three numbers—either $L_m a_m b_m$ or $L_m C_m h_m$ representing either L*, a* and b* or L*, C* and h*, where L* represents lightness, a* represents a red-green chromaticity axis, b* represents a yellow-blue chromaticity axis, C* represents chroma, and h* represents hue. Because of the anisotropic behavior allowed to magnets, it can sometimes be misleading to describe magnet location as a single point in color space. Depending on the way that the color space distance calculation is defined, it can sometimes be better to visualize a magnet as a line, a plane or a cylinder rather than a single point, as will be further elucidated in the material on distance calculation below.

With regard to the way that the color space distance calculation is defined for the magnet, it should be noted that a consequence of the anisotropy of a color space is that color magnets need to be able to display anisotropic behavior. In all color spaces the three (or more) dimensions of the color space represent different properties of a color. An example of this is the lightness, chroma and hue system. This can be contrasted with a three dimensional geometric space in which all the dimensions represent length. Thus, in the geometric space we expect the same behavior no matter which direction we travel within the space (isotropic behavior). In the color space however, if we move along the lightness dimension we observe color to change in lightness, while if we move along the hue dimension we would see colors change from red to orange to yellow etc at constant lightness and chroma. Accordingly, if we move a color a fixed distance higher in the lightness dimension it will become lighter, but if we were to move the same distance in the hue dimension it may change from red to yellow (anisotropic behavior).

Turning now to magnet behavior, as stated above in relation to FIG. 1, the effect that the magnet has on colors within its region of influence is controlled by three factors: The type of magnetic behavior ascribed to the magnet (i.e. attract, repel, shield or drag), a function that describes how magnetic effect 4: changes with color space distance (as it is defined for that particular magnet) and the strength factors that allow additional control over the direction of color change within the color space. Four types of magnet behavior have been defined in the color magnet algorithm:

Attraction—the magnet attracts colors to or towards itself.

Repulsion—the magnet repels colors from itself

Dragging—the magnet itself moves in the color space, dragging nearby colors along with it.

Shielding—the effect of the magnet is to shield nearby colors from the effects of other color magnets.

These behaviors are shown graphically in FIGS. 4 to 7 for each of the behaviors, respectively, in CIELab a* versus b* space and L* versus C* space.

Referring again to FIG. 3, in step 210 the distances between each color and each magnet is calculated. Anisotropy in the calculation of color space distance is introduced by allowing separate weightings for the three dimensions of the color space. Thus, in the CIELab/CIELCh color space the distance, $d_{c,m}$, of a particular color at location $L_c a_c b_c$ from a magnet at location $L_m a_m b_m$ is calculated as follows:

$$\Delta a^*_{c,m} = a^*_m - a^*_c \quad [1]$$

$$\Delta b^*_{c,m} = b^*_m - b^*_c \quad [2]$$

$$\Delta L^*_{c,m} = L^*_m - L^*_c \quad [3]$$

$$\Delta E^*_{c,m} = \sqrt{(\Delta L^*_{c,m})^2 + (\Delta a^*_{c,m})^2 + (\Delta b^*_{c,m})^2} \quad [4]$$

$$C^* = \sqrt{a^{*2} + b^{*2}} \quad [5]$$

$$\Delta C^*_{c,m} = C^*_m - C^*_c \quad [6]$$

$$\Delta H^*_{c,m} = \sqrt{(\Delta E^*_{c,m})^2 - (\Delta L^*_{c,m})^2 - (\Delta C^*_{c,m})^2} \quad [7]$$

$$d_{c,m} = \sqrt{(w_{L_m} \Delta L^*_{c,m})^2 + (w_{C_m} \Delta C^*_{c,m})^2 + (w_{H_m} \Delta H^*_{c,m})^2} \quad [8]$$

It is apparent from equation 8 above that the weights $W_{L_m}$, $W_{C_m}$ and $W_{H_m}$ can be used to control the anisotropy in the calculation of color space distance. Each magnet has its own unique set of weights $W_{L_m}$, $W_{C_m}$ and $W_{H_m}$ and can therefore exhibit different anisotropy from other magnets. As an example, consider a magnet for which $W_{L_m}$ is set to zero. This is a magnet that is insensitive to lightness. The shape of this magnet could therefore be considered as a straight line parallel to the L* axis. The distance to colors in the color space therefore depends only on the chroma and hue differences between the magnet and the color in question. Another example is a magnet for which both $W_{L_m}$ and $W_{H_m}$ are zero. The magnet is therefore insensitive to both lightness and hue. This magnet could be visualized in CIELab space as a cylinder, parallel to the L* axis and with a radius equal to the chroma of the magnet's center.

Step 220 is the calculation of the magnetic effect field of each color magnet, shield and dragnet on all colors in the image or color set. The effect field of a color magnet, as a function of distance from the color magnet center, can be described using any one of a variety of functions. The practical choice of such a function is, however, constrained by a need for desirable characteristics for a color magnet mapping. Desirable characteristics include:

Mappings are smooth and continuous and, when applied to images, do not result in abrupt transitions or contours.

Magnet behavior is predictable and reasonable. That is, magnet effect field is strongest at the location of the magnet center and diminishes with distance. At sufficiently large distances the magnet should have no effect field.

In order to achieve these characteristics, a mathematical function describing the effect field of a color magnet as a function of distance should preferably have the following properties:

The function has a maximum at a distance of zero.

The function decreases smoothly and continuously as distance increases.

The function asymptotically approaches zero as distance approaches infinity.

The function is always non-negative.

The function has a slope of zero at zero distance.

While a variety of functions may be used that at least approximate the desirable properties mentioned above, the initial version of color magnets uses either of the two following functions, both having the properties listed above, to describe the magnet effect field, $q_{c,m}$ at color location c resulting from color magnet m, as a function of distance, $d_{c,m}$. The first of these is a pseudo-Gaussian type of function (equation [9]) and the second is an inverse multi-quadric function (equation [10]):

$$q_{c,m} = \exp\left(\frac{-d^\sigma_{c,m}}{\rho^\sigma}\right) \quad [9]$$

$$q_{c,m} = \frac{1}{1 + \frac{d^\sigma_{c,m}}{10\rho}} \quad [10]$$

In equations [9] and [10], σ is a parameter that controls the slope and ρ is a parameter that controls the width of the effect field function. The use of a factor of 10 ρ in the denominator of [10] is arbitrary and is chosen to make the half width of [10] similar to that of [9].

At this point (step 230) in the algorithm it is necessary to separate the shields from the other magnets and dragnets. This is because of their fundamentally different types of behavior—magnets and dragnets act to move colors within the color space while shields act to prevent movement of colors by attenuating the effects of magnets and dragnets.

Step 240 is the calculation of the effect field of each magnet or dragnet on every other magnet or dragnet. This calculation is entirely analogous to that summarized in equations [9] and [10] and is given by equations [11] and [12] for the two example effect field functions.

$$q_{m_1,m_2} = \exp\left(\frac{-d^{\sigma_{m_1}}_{m_1,m_2}}{\rho^{\sigma_{m_1}}_{m_1}}\right) \quad [11]$$

$$q_{m_1,m_2} = \frac{1}{1 + \frac{d^{\sigma_{m_1}}_{m_1,m_2}}{10\rho_{m_1}}} \quad [12]$$

In these equations, $q_{m_1,m_2}$ is the magnetic effect field of magnet $m_1$ on magnet $m_2$, $d_{m_1,m_2}$ is the color space distance from magnet $m_1$ to magnet $m_2$ calculated using the distance anisotropy weightings assigned to magnet $m_1$, $\sigma_{m_1}$ is the slope parameter assigned to magnet $m_1$ and $\rho_{m_1}$ is the width parameter assigned to magnet $m_1$.

In order to ensure smooth and consistent movement of colors within the color space when colors are being influenced simultaneously by multiple magnets and dragnets we must perform a normalization of the effect fields. This is accomplished in step 250. In general, there will be a set of j magnets all simultaneously acting on all k colors in a color set. These j magnets comprise a total of μ attractive and repulsive magnets and η dragnets. It is desirable that colors that are exactly at the location of an attractive magnet are not moved away by the influence of other magnets. This problem is analogous to a multi-dimensional scattered data interpolation problem where it is desirable to reproduce data points exactly while interpolating smoothly between them. One simple approach to this problem is the method of inverse distance interpolation as discussed in *Mathematics of Computation*, Volume 38, pp 181–200, (1982) by Richard Franke. Other interpolation methods described in this reference would be similarly applicable.

Following this method, interpolation for attractive color magnets is implemented as follows. The magnetic effect field of each magnet on each color is represented by matrix $Q_{c,m}$ and the magnetic effect field of each magnet on each other magnet by matrix $P_{m,m}$:

$$Q_{c,m} = \begin{bmatrix} q_{c_1,m_1} & q_{c_1,m_2} & \cdots & q_{c_1,m_j} \\ q_{c_2,m_1} & q_{c_2,m_2} & \cdots & q_{c_2,m_j} \\ \vdots & \vdots & \ddots & \vdots \\ q_{c_k,m_1} & q_{c_k,m_2} & \cdots & q_{c_k,m_j} \end{bmatrix} \quad [13]$$

$$P_{m,m} = \begin{bmatrix} q_{m_1,m_1} & q_{m_1,m_2} & \cdots & q_{m_1,m_j} \\ q_{m_2,m_1} & q_{m_2,m_2} & \cdots & q_{m_2,m_j} \\ \vdots & \vdots & \ddots & \vdots \\ q_{m_j,m_1} & q_{m_j,m_2} & \cdots & q_{m_j,m_j} \end{bmatrix} \quad [14]$$

(Note: Because each magnet can display unique anisotropy, the matrix $P_{m,m}$ is not generally symmetric.) The normalized attraction matrix $N_{c,m}$ is then calculated as $$N_{c,m} = [P_{m,m}^{-1} Q_{c,m}^T]^T \quad [15]$$

The normalized attraction matrix has k rows and j columns as follows:

$$N_{c,m} = \begin{bmatrix} n_{c_1,m_1} & n_{c_1,m_2} & \cdots & n_{c_1,m_j} \\ n_{c_2,m_1} & n_{c_2,m_2} & \cdots & n_{c_2,m_j} \\ \cdots & \cdots & \ddots & \vdots \\ n_{c_k,m_1} & n_{c_k,m_2} & \cdots & n_{c_k,m_j} \end{bmatrix} \quad [16]$$

In step 260, the total shielding, from the combined effect of all shields, on each color is calculated. The shielding behavior of a color to a color magnet, as a function of color space distance between the color magnet center and the color, can be described by using a matrix. If there are i shields simultaneously acting on k colors in a color set or image, then the shielding effect field on each color by each shield can be represented by the matrix $R_{s,m}$.

$$R_{s,m} = \begin{bmatrix} q_{c_1,s_1} & q_{c_1,s_2} & \cdots & q_{c_1,s_1} \\ q_{c_2,s_1} & q_{c_2,s_2} & \cdots & q_{c_2,s_1} \\ \vdots & \vdots & \ddots & \vdots \\ q_{c_k,s_1} & q_{c_k,s_2} & \cdots & q_{c_k,s_1} \end{bmatrix} \quad [17]$$

We now calculate the total shielding for each color, c, in the lightness, chroma and hue dimensions. In the matrix $^{Total}R_{LCH_c}$, total lightness shielding is found in column 1, total chroma shielding is in column 2 and total hue shielding is in column 3:

$$^{Total}R_{LCH_c} = \begin{bmatrix} 1 - \prod_{a=1}^{i} A_{L_a}(1 - q_{c_1 s_a}) & 1 - \prod_{a=1}^{i} A_{C_a}(1 - q_{c_1 s_a}) & 1 - \prod_{a=1}^{i} A_{H_a}(1 - q_{c_1 s_a}) \\ 1 - \prod_{a=1}^{i} A_{L_a}(1 - q_{c_2 s_a}) & 1 - \prod_{a=1}^{i} A_{C_a}(1 - q_{c_2 s_a}) & 1 - \prod_{a=1}^{i} A_{H_a}(1 - q_{c_2 s_a}) \\ 1 - \prod_{a=1}^{i} A_{L_a}(1 - q_{c_k s_a}) & 1 - \prod_{a=1}^{i} A_{C_a}(1 - q_{c_k s_a}) & 1 - \prod_{a=1}^{i} A_{H_a}(1 - q_{c_k s_a}) \end{bmatrix} \quad [18]$$

$$^{Total}R_{LCH_c} = \begin{bmatrix} r_{L_1} & r_{C_1} & r_{H_1} \\ r_{L_2} & r_{C_2} & r_{H_2} \\ \vdots & \vdots & \vdots \\ r_{L_k} & r_{C_k} & r_{H_2} \end{bmatrix} \quad [19]$$

The constants $A_{L_a}$, $A_{C_a}$ and $A_{H_a}$ are the strength values of shield a for the lightness, chroma and hue color dimensions respectively.

In step 270 of the method the 'force' of each magnet, accounting for shielding, on each color is calculated. In equation [20] the n terms are from the normalized attraction matrix (equation [16]) and the r terms are from the total shielding matrix (equation [19]):

$$F_{c,m} = \begin{bmatrix} n_{c_1,m_1}(1-r_1) & n_{c_1,m_2}(1-r_1) & \cdots & n_{c_1,m_j}(1-r_1) \\ n_{c_2,m_1}(1-r_2) & n_{c_2,m_1}(1-r_2) & \cdots & n_{c_2,m_j}(1-r_2) \\ \cdots & \cdots & \cdots & \vdots \\ n_{c_k,m_1}(1-r_k) & n_{c_k,m_2}(1-r_k) & \cdots & n_{c_k,m_j}(1-r_k) \end{bmatrix} = \quad [20]$$

$$\begin{bmatrix} f_{c_1,m_1} & f_{c_1,m_2} & \cdots & f_{c_1,m_j} \\ f_{c_2,m_1} & f_{c_2,m_2} & \cdots & f_{c_2,m_j} \\ \cdots & \cdots & \ddots & \vdots \\ f_{c_k,m_1} & f_{c_k,m_2} & \cdots & f_{c_k,m_j} \end{bmatrix}$$

Steps 280, 290 and 300 of the method describe the calculation of the change in lightness hue and chroma of each color due to the action of all of the magnets. The calculations here are slightly different for magnets and dragnets, so in step 280 the dragnets are sorted from the attractive and repulsive magnets.

Dealing with attractive and repulsive magnets only in step 290 the change in lightness, and chroma and hue of each color due to the combined action of all of the magnets, allowing for shielding is calculated in the following equation [21]:

$$^{magnets}\Delta LCH_c = \begin{bmatrix} \sum_{\alpha=1}^{\mu} g_\alpha A_{L_\alpha} f_{c_1,m_a} \Delta L^*_{c_1,m_a} & \sum_{\alpha=1}^{\mu} g_\alpha A_{C_\alpha} f_{c_1,m_a} \Delta C^*_{c_1,m_a} & \sum_{\alpha=1}^{\mu} g_\alpha A_{H_\alpha} f_{c_1,m_a} \Delta H^*_{c_1,m_a} \\ \sum_{\alpha=1}^{\mu} g_\alpha A_{L_\alpha} f_{c_2,m_a} \Delta L^*_{c_2,m_a} & \sum_{\alpha=1}^{\mu} g_\alpha A_{C_\alpha} f_{c_2,m_a} \Delta C^*_{c_2,m_a} & \sum_{\alpha=1}^{\mu} g_\alpha A_{H_\alpha} f_{c_2,m_a} \Delta H^*_{c_2,m_a} \\ \sum_{\alpha=1}^{\mu} g_\alpha A_{L_\alpha} f_{c_k,m_a} \Delta L^*_{c_k,m_a} & \sum_{\alpha=1}^{\mu} g_\alpha A_{C_\alpha} f_{c_k,m_a} \Delta C^*_{c_k,m_a} & \sum_{\alpha=1}^{\mu} g_\alpha A_{H_\alpha} f_{c_1,m_a} \Delta H^*_{c_k,m_a} \end{bmatrix}$$

In equation [21], $\mu$ is the total number of attractive and repulsive magnets and $g_\alpha$ takes the value +1 if magnet $\alpha$ is an attractive magnet and −1 if magnet $\alpha$ is a repulsive magnet. The constants $A_{L_\alpha}$, $A_{C_\alpha}$ and $A_{H_\alpha}$ are the strength values of magnet $\alpha$ for the lightness, chroma and hue color dimensions respectively. The changes in lightness are in column 1 of the matrix while changes in hue and chroma can be found in columns 2 and 3 respectively.

In step 300 the change in lightness, chroma and hue of each color due to the combined action of all of the dragnets, allowing for shielding is calculated as follows:

$$^{dragnets}\Delta LCH_c = \begin{bmatrix} \sum_{\alpha=1}^{\eta} f_{c_1,m_a} \Delta L^*_{m_a} & \sum_{\alpha=1}^{\eta} f_{c_1,m_a} \Delta C^*_{m_a} & \sum_{\alpha=1}^{\eta} f_{c_1,m_a} \Delta H^*_{m_a} \\ \sum_{\alpha=1}^{\eta} f_{c_2,m_a} \Delta L^*_{m_a} & \sum_{\alpha=1}^{\eta} f_{c_2,m_a} \Delta C^*_{m_a} & \sum_{\alpha=1}^{\eta} f_{c_2,m_a} \Delta H^*_{m_a} \\ \vdots & \vdots & \vdots \\ \sum_{\alpha=1}^{\eta} f_{c_k,m_a} \Delta L^*_{m_a} & \sum_{\alpha=1}^{\eta} f_{c_k,m_a} \Delta C^*_{m_a} & \sum_{\alpha=1}^{\eta} f_{c_k,m_a} \Delta H^*_{m_a} \end{bmatrix} \quad [22]$$

In equation [22], $\eta$ is the total number of dragnets. The constants $\Delta L^*_{m_a}$, $\Delta C^*_{m_a}$ and $\Delta H^*_{m_a}$ are the shift (or drag) distances for dragnet $a$ in the lightness, chroma and hue color dimensions respectively.

The transformed colors are now calculated in step 310 according to equation [23], where, if the original colors are represented as LCH, then the new colors LCH' are:

$$LCH' = LCH + {}^{magnets}\Delta LCH + {}^{dragnets}\Delta LCH \quad [23]$$

It should be remembered that equation [23] represents vector addition and that hue is a periodic dimension.

Figure 8:
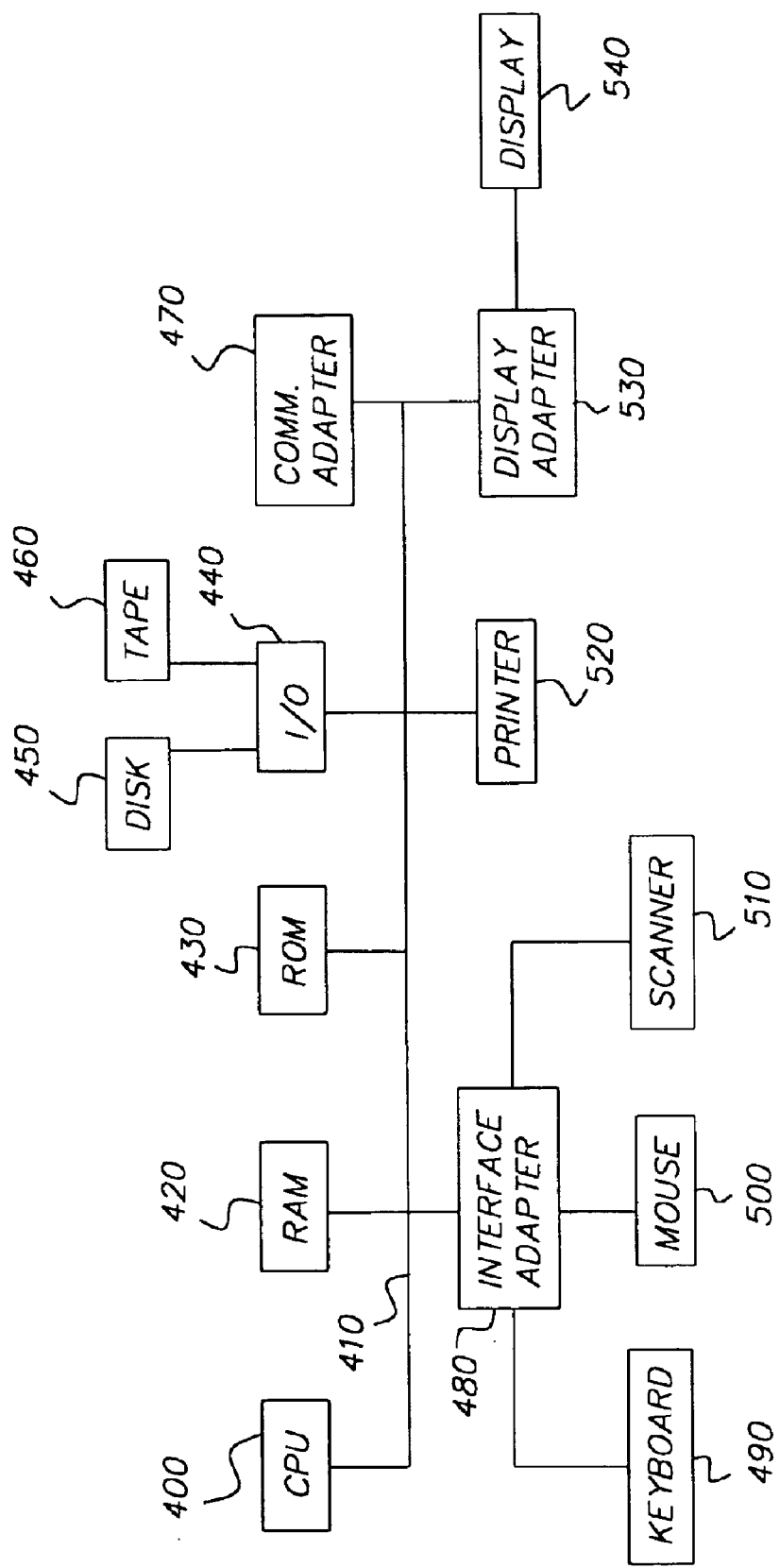
FIG. 8 is a perspective diagram of a computer system for implementing the present invention.

While the overall methodology of the invention is described above, the invention can be embodied in any number of different types of systems and executed in any number of different ways, as would be known by one ordinarily skilled in the art. For example, as illustrated in FIG. 8, a typical hardware configuration of an information handling/computer system in accordance with the invention preferably has at least one processor or central processing unit (CPU) 400. The CPU 400 is interconnected via a system bus 410 to a random access memory (RAM) 420, a read-only memory (ROM) 430, an input/output (I/O) adapter 440 (for connecting peripheral devices such as disk units 450 and tape drives 460 to the bus 410), a communication adapter 470 (for connecting an information handling system to a data processing network), a user interface adapter 480 (for connecting peripherals 490, 500, 510 such as a keyboard, mouse, digital image input unit, microphone, speaker and/or other user interface device to the bus 410), a printer 520 and a display adapter 530 (for connecting the bus 410 to a display device 540). The invention could be implemented using the structure shown in FIG. 8 by including the inventive method within a computer program stored on the storage device 450. Such a computer program would act on an image frame supplied through the interface units 490, 500, 510 or through the network connection 470. The system would then automatically produce the desired color space transformation, which would provide the improved images to the display 540, to the printer 520 or back to the network 470. In the preferred embodiment, the coefficients for the transformations would be predetermined (precalculated) for given magnets at given preferred locations and stored in look up tables in memory such as the disk drive 450. Then, the actual conversion of the digital color data would involve accessing the look up tables to determine the transformed code value for each input code value.

When natural images are processed practicing this invention, gradations in color or between colors appear smooth or sharp in the rendered images as they did in the original image. Specifically continuous transitions are smooth and continuous and do not produce artifacts, discontinuities or contours. In addition, the overall impression of the composition of the image is such that the rendered image is more pleasing than prior to treatment with the algorithm. The time required to process an image is minimized because the transformation is calculated off line. This can be done because the transformation is universally applicable to all natural images, not just a small subclass of images. Thus in operational use, the required calculations are extremely rapid because they only require the application of a single three-dimensional look up table to the pixels in the image. The transformation can be applied to images in a high volume digital photofinishing application in real time.

The invention has been described in detail with particular reference to certain preferred embodiments thereof, but it will be understood that variations and modifications can be effected within the spirit and scope of the invention.

Parts List 10 behavior of a color magnet
12 region of influence
14 effect 16 location of center
18 color space distance calculation
20 magnetic behavior
22 function
24 strength factors
100-170 steps
200-310 steps
400 CPU
410 bus
420 RAM
430 ROM
440 I/O adapter
450 disk unit
460 tape drive
470 communication adapter
480 interface adapter
490 keyboard
500 mouse
510 digital image input unit
520 printer
530 display adapter
540 display device

What is claimed is:

1. A method of transforming a file of digital color data representing a color image to a new file of digital color data where one or more colors have been transformed to one or more new color locations where their reproduction is known to be preferred, said method comprising the steps of:
    (a) providing the digital color data in a multi-dimensional color space;
    (b) specifying one or more preferred color locations in the color space as one or more color magnets, wherein each color magnet has an influence on other colors in the color space wherein the strength of the color magnet's influence is a function of the distance of the other color in color space from the color magnet;
    (c) calculating color space distance between one or more color locations of the digital color data in the color space and one or more of the color magnets;
    (d) prescribing a particular behavior for each color magnet that determines the characteristic of the effects on surrounding colors in the color space of each color magnet; and
    (e) remapping the digital color data to new locations in the multi-dimensional color space as a function of the color space distance of individual data locations from each color magnet and the behavior of the color magnet(s), wherein the degree or strength of behavior's influence is a function of at least the color space distance from the color magnet(s) or direction in color space.

2. The method as claimed in claim 1 wherein said behavior specified in step (d) includes at least one behavior selected from the group including attraction, repulsion, shielding and dragging.

3. The method as claimed in claim 2 wherein in the behavior of attraction the color magnet attracts colors to or toward itself.

4. The method as claimed in claim 2 wherein in the behavior of repulsion the color magnet repels colors from itself.

5. The method as claimed in claim 2 wherein in the behavior of shielding the color magnet shields nearby colors from the affect(s) of other color magnet(s).

6. The method as claimed in claim 2 wherein in the behavior of dragging the color magnet itself moves in the color space, dragging nearby colors along with it in a prescribed and smoothly varying manner.

7. The method as claimed in claim 1 wherein the preferred color location is selected from the group including a point, line, plane, or cylinder in the color space.

8. The method as claimed in claim 1 wherein the preferred color location is known to a viewer of the color image to be preferably reproduced in a particular accurate calorimetric manner relative to other renderings of that color.

9. The method as claimed in claim 8 wherein the preferred color location includes at least one of sky, foliage and skin tones.

10. The method as claimed in claim 1 wherein the multi-dimensional color space is CIELab/CIELCh color space.

11. The method as claimed in claim 1 wherein the multi-dimensional color space is CIELUV color space.

12. The method as claimed in claim 1 wherein the multi-dimensional color space is any color space wherein the dimensions correspond to perceptual attributes of color for human observers, including one or more of lightness, brightness, chroma, colorfulness, saturation and hue.

13. The method as claimed in claim 1 wherein step (c) introduces anisotropic behavior into the calculation of color space distance by allowing for separate weightings in one or more of the dimensions of the multi-dimensional color space.

14. The method as claimed in claim 1 wherein step (e) introduces anisotropic behavior into the mapping by allowing for separate degrees or strengths of behavior in one or more of the dimensions of the multi-dimensional color space.

15. A computer program product for transforming a file of digital color data representing a color image to a new file of digital color data comprising: a computer readable storage medium having a computer program stored thereon for performing the steps of:
    (a) providing the digital color data in a multi-dimensional color space;
    (b) specifying one or more preferred color locations in the color space as one or more color magnets, wherein each color magnet has e an influence on other colors in the color space wherein the strength of the color magnet's influence is a function of the distance of the other color in color space from the color magnet;
    (c) calculating color space distance between one or more color locations of the digital color data in the color space and one or more of the color magnets;
    (d) prescribing a particular behavior for each color magnet that determines the characteristic of the color magnet's effects on other colors in the color space; and
    (e) remapping the digital color data to new locations in the multi-dimensional color space as a function of the color space distance of individual data locations from each color magnet(s) and the behavior of each color magnet, wherein the degree or strength of the behavior's influence is a function of the color space distance or direction in color space, thereby transforming the digital color data to new color locations where their reproduction is known to be preferred.

16. The computer program product as claimed in claim 15 wherein said behavior specified in step (d) includes at least one behavior selected from the group including attraction, repulsion, shielding and dragging.

17. The computer program product as claimed in claim 16 wherein in the behavior of attraction the color magnet attracts colors to or toward itself.

18. The computer program product as claimed in claim 16 wherein in the behavior of repulsion the color magnet repels colors from itself.

19. The computer program product as claimed in claim 16 wherein in the behavior of shielding the color magnet shields nearby colors from the effects of other color magnets.

20. The computer program product as claimed in claim 16 wherein in the behavior of dragging the color magnet itself moves in the color space, dragging nearby colors along with it in a prescribed and smoothly varying manner.

21. The computer program product as claimed in claim 15 wherein the preferred color location is selected from the group including a point, line, plane, or cylinder in the color space.

22. The computer program product as claimed in claim 15 wherein the preferred color location is known to a viewer of the color image to be preferably reproduced in a particular accurate manner relative to other renderings of that color.

23. The computer program product as claimed in claim 22 wherein the preferred color location includes at least one of sky, foliage and skin tones.

24. The computer program product as claimed in claim 15 wherein the multi-dimensional color space is CIELab/CIELCh color space.

25. The computer program product as claimed in claim 15 wherein the multi-dimensional color space is CIELUV color space.

26. The computer program product as claimed in claim 15 wherein the multi-dimensional color space is any color space wherein the dimensions correspond to perceptual attributes of color for human observers, including one or more of lightness, brightness, chroma, colorfulness, saturation and hue.

27. The computer program product as claimed in claim 15 wherein step (c) introduces anisotropic behavior into the calculation of color space distance by allowing for separate weightings in one or more of the dimensions of the multi-dimensional color space.

28. The computer program product as claimed in claim 15 wherein step (e) introduces anisotropic behavior into the mapping by allowing for separate degrees (strengths) of behavior in one or more of the dimensions of the multi-dimensional color space.

29. A system for transforming a file of digital color data representing a color image to a new file of digital color data, said system comprising:

means for providing the digital color data in a multidimensional color space;

means for specifying one or more preferred color locations in the color space as one or more color magnets, wherein each color magnet has an influence and a particular behavior that affects other color locations in the color space;

a processor for (a) calculating color space distance between the other color locations of the digital color data in the color space and one or more of the color magnets and (b) mapping the digital color data to new locations in the multi-dimensional color space as a function of the color space distance and the color magnet's behavior, wherein the degree or strength of the behavior is a function of the color space distance or direction in color space, thereby transforming the digital color data to new color locations where their reproduction is known to be preferred.

30. The system as claimed in claim 29 wherein said behavior specified includes at least one behavior selected from the group including attraction, repulsion, shielding and dragging.

31. The system as claimed in claim 30 wherein in the behavior of attraction the color magnet attracts colors to or toward itself.

32. The system as claimed in claim 30 wherein in the behavior of repulsion the color magnet repels colors from itself.

33. The system as claimed in claim 30 wherein in the behavior of shielding the color magnet shields nearby colors from the effects of other color magnets.

34. The system as claimed in claim 30 wherein in the behavior of dragging the color magnet itself moves in the color space, dragging nearby colors along with it in a prescribed and smoothly varying manner.

* * * * *

UNITED STATES PATENT AND TRADEMARK OFFICE
CERTIFICATE OF CORRECTION

PATENT NO. : 6,894,806 B1 Page 1 of 1
APPLICATION NO. : 09/540807
DATED : May 17, 2006
INVENTOR(S) : Geoffrey J. Woolfe et al.

It is certified that error appears in the above-identified patent and that said Letters Patent is hereby corrected as shown below:

Column 16, Line 8, claim 8    "calorimetric" should read -- colorimetric --

Column 16, Line 44, claim
15 (b) section    "has e an" should read --has an --

Signed and Sealed this

Fourteenth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 6,894,806 B1  
APPLICATION NO. : 09/540807  
DATED : May 17, 2005  
INVENTOR(S) : Geoffrey J. Woolfe et al.

Page 1 of 1

It is certified that error appears in the above-identified patent and that said Letters Patent is hereby corrected as shown below:

Column 16, Line 8, claim 8     "calorimetric" should read -- colorimetric --

Column 16, Line 44, claim 15 (b) section     "has e an" should read --has an --

This certificate supersedes Certificate of Correction issued August 14, 2007.

Signed and Sealed this

Fourth Day of September, 2007

JON W. DUDAS  
*Director of the United States Patent and Trademark Office*